United States Patent [19]

Davis

[11] 4,020,590
[45] May 3, 1977

[54] APPARATUS AND METHOD FOR EXPOSING SEEDS TO A MAGNETIC FIELD

[75] Inventor: Albert Roy Davis, Green Cove Springs, Fla.

[73] Assignee: BioMagnetics International Inc., Jacksonville, Fla.

[22] Filed: Dec. 15, 1975

[21] Appl. No.: 640,931

[52] U.S. Cl. .................................. 47/1.3; 47/58
[51] Int. Cl.² .................. A01C 1/00; A01G 7/04
[58] Field of Search ............... 47/1.3, 57.6, 58, 1.2

[56] References Cited

UNITED STATES PATENTS

| 51,745 | 12/1865 | Page | 47/58 |
|---|---|---|---|
| 1,633,301 | 6/1927 | Williams | 47/58 |
| 2,731,770 | 1/1956 | Rhea | 47/58 |
| 2,954,643 | 10/1960 | Porter et al. | 47/58 |
| 3,460,492 | 8/1969 | Dickinson et al. | 47/57.6 |
| 3,675,367 | 7/1972 | Amburn | 47/1.3 |
| 3,911,619 | 10/1975 | Dedolph | 47/1.2 |

FOREIGN PATENTS OR APPLICATIONS

| 270,367 | 5/1970 | U.S.S.R. | 47/58 |
|---|---|---|---|
| 1,065,864 | 4/1967 | United Kingdom | 47/1.3 |

OTHER PUBLICATIONS

Maronek, D. M., *Hortscience* 6-1975, vol. 10, pp. 227-228. "Electromagnetic Seed Treatment Increases Germination of Koelreuteria Paniculata Laxm".

*Primary Examiner*—Edgar S. Burr
*Assistant Examiner*—James R. Feyrer
*Attorney, Agent, or Firm*—Stuart J. Friedman

[57] ABSTRACT

Apparatus for magnetically treating seeds comprises a magnet for producing a unipolar magnetic field, an enclosed generally cylindrical housing having a closable access opening therein in which said seeds are placed for treatment, drive means associated with the housing for rotating said housing and imparting rolling and tumbling motion to the seeds within the housing, the housing being disposed with respect to the magnet such that the seeds move through the magnetic field as they roll and tumble. By magnetically treating the seeds in a unipolar magnetic field while rolling and tumbling the seeds, the characteristics of plants grown therefrom are favorably altered.

18 Claims, 2 Drawing Figures

APPARATUS AND METHOD FOR EXPOSING SEEDS TO A MAGNETIC FIELD

BACKGROUND OF THE INVENTION

1. Field of the Invention

The present invention relates to magneto magnetic energy and, more particularly, to a method and apparatus for the application of such energy to seeds.

2. Description of the Prior Art

It is now generally accepted that when any biological living system lives in a strong magnetic environment, its physical and genetic development is to some extent altered. For example, it has long been known that the rate of seed germination and the rate of plant growth from seeds is affected by magnetism. This phenomenon is discussed in U. J. Pittman, "Biomagnetism—a Mysterious Plant Growth Factor", Canada Agriculture, Summer—1968 edition. In a more recent report, Moustafa, "Effect of Seed Exposure of Magnetic Field on Plant Physical Properties and Yield", ASAE Paper No. 73-316 (June, 1973), concluded that exposing seeds to an electromagnetic field prior to planting appeared to increase the rate of germination and the total plant leaf area, at least under growth chamber conditions.

In an effort to reduce the necessary exposure time for seeds to become adequately treated by magnetism so that the magnetically treated seeds can be commercially used, Amburn disclosed in U.S. Pat. No. 3,675,367 an apparatus for moving seeds through a magnetic field. The Amburn apparatus consists essentially of an elongated tube having an electromagnet mounted thereon intermediate its ends to establish a magnetic flux field within the tube. A conveyor assembly, comprising an auger, conveys the seeds through the tube in such a manner that the seeds roll and tumble while within the magnetic field to expose the seeds in a multiplicity of positions with respect to the magnetic field. Amburn reports that treating seeds in this fashion increased crop yield from the treated seeds as compared with crop yield from the untreated seeds.

The magnetic field to which Amburn exposed his seeds was bipolar in that it had both a north and a south pole applying their respective energies to the seeds. Amburn points out that there were some indications that greater success was achieved in treating the seeds when the north pole was located at the inlet end of the apparatus. However, there was no suggestion or appreciation that one of the poles could or would produce different results from the other of the poles. This is, of course, because Amburn subscribed to the commmon belief extant over the years relating to magnets, which has been that the two magnetic poles, north and south, are homogeneous and that they emanate the same potential type of energy. This belief has now been found to be a misconception—the two poles of a magnet are in fact totally different in electric potential and effect—and the application of the respective poles to living systems has been found to produce quite different results.

The north pole (which is defined as the south-seeking pole) is now believed to provide a negative form of energy while the south pole (which is defined as the north-seeking pole) is believed to provide a positive form of energy. To support this discovery, it has been found that upon examination of the electron paths associated with the fields surrounding the respective poles that the south pole end of a magnet provides a right hand spin of electrons, i.e., a clockwise rotation of electron movement, as contrasted with the north pole electron spin, which presents a left hand spin or counter-clockwise rotation of its electron field. It has further been observed that the lines of magnetic energy leave the south pole to re-enter the magnet at the Bloch Wall where a 180° phase change takes place, then leave the Bloch Wall at that point to then go on as the north pole energy to re-enter the magnet at its north pole. For a more detailed discussion of this phenomena, see Davis et al, *Magnetism and its Effects on the Living System* and *The Magnetic Effect* (Exposition Press, Hicksville, N.Y.).

The differing effects of the north and south poles, respectively, on seed germination rate and plant growth height was appreciated in a somewhat different context by Tsukamoto in British Patent Specification No. 1,065,864 wherein a disintegrable permanent magnet for use in the soil is disclosed. Of course, the Tsukamoto teaching does not extend to an apparatus for pretreating the seeds prior to planting or to a method for rotating and tumbling the seeds prior to planting in a unipolar magnetic field.

SUMMARY OF THE INVENTION

It is therefore an object of the present invention to provide a method and apparatus for unipolar treatment of seeds and/or seedlings in a magnetic field prior to planting.

It is another object of the invention to provide a method and apparatus for closely controlling the exposure time of seeds in a unipolar magnetic field.

It is still another object of the invention to provide an apparatus which can accommodate, without damage, all sizes and shapes of seeds and seedlings while rolling and tumbling them in a unipolar magnetic field.

It is yet another object of this invention to provide an apparatus for simultaneously exposing seeds or seedlings in contact with a liquid or gaseous medium to a unipolar magnetic field.

Other objects and advantages will become apparent from the following description and appended claims.

Briefly stated, in accordance with the aforesaid objects, the present invention provides a housing adapted for receiving and containing seeds or seedlings which housing includes drive means for causing movement of the housing, e.g., rotating the housing about an axis, to cause the seeds and seedlings to roll and tumble therein. One pole of a magnet produces a magnetic field through which said housing rotates such that the seeds and seedlings therein are more or less continuously exposed to the unipolar magnetic field. Timer means may be operatively associated with the drive means in order to closely control the exposure time of the seeds and seedlings to the field, which exposure time has been found to be critical for achieving optimum improved results. The housing has communicating therewith inlet and outlet ports for receiving and discharging gaseous or liquid materials therethrough and which provides the capability of magnetically treating the seeds together with said fluid materials for reasons which will become more fully apparent hereinafter.

BRIEF DESCRIPTION OF THE DRAWINGS

The invention will be better understood in all its embodiments from a consideration of the following description taken together with the accompanying drawings, in which.

DETAILED DESCRIPTION OF THE PREFERRED EMBODIMENTS

The present invention is primarily concerned with the use of magneto magnetic energy, i.e., magnetic energy derived from a magnet as opposed to some other source, on seeds and seedlings. By use of the term "seeds" herein, it is intended to encompass any plant material from which further plants may by grown, e.g., seeds, seedlings, bulbs, cuttings, stalks, and the like. One particularly advantageous "seed" are sugar cane stalks (e.g., 5–7 feet long) which, after treatment in accordance with the present invention, may be planted horizontally. It has been found that after planting, shoots appear to grow from the stalk joints. Any type of magnet is suitable for use herein in which the poles are sufficiently separated that the energy of each pole can be isolated from the energy of the other pole. In this way a unipolar magnetic field can be applied to the seeds. Thus, separation of the poles is the prime requisite in selecting an appropriate magnet. Straight bar or cylindrical magnets provide maximum pole separation and are desirable. Either solid state or long-wound electromagnets, however, are equally useful.

Figure 1:
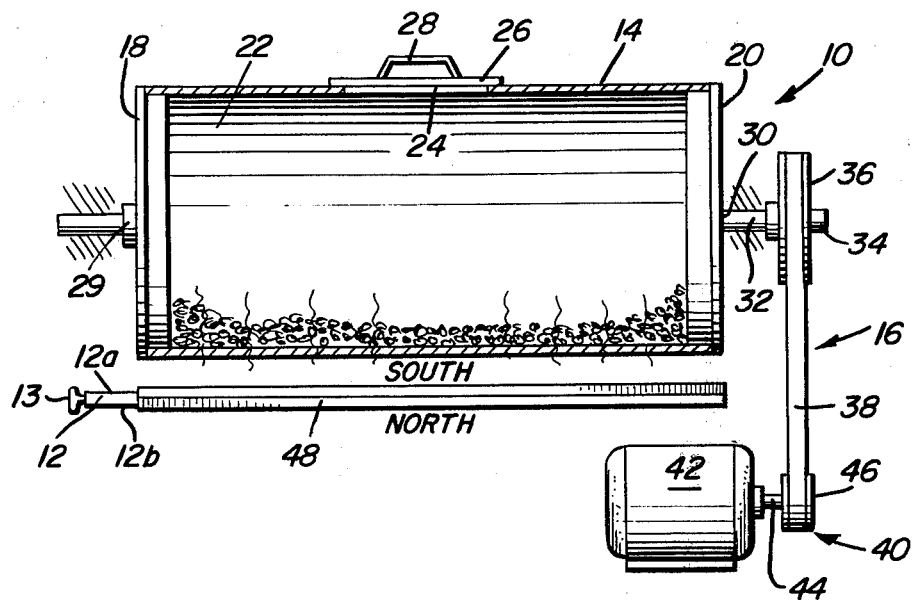
FIG. 1 is an elevational view of an exemplary cylindrical seed containing housing, drive means therefor and unipolar magnetic field producing means of the present invention.

A typical apparatus for exposing seeds to a unipolar magnetic field is shown in FIG. 1 generally at 10. The apparatus consists of a magnet 12, a housing 14 which moves through the magnetic field created by magnet 12, and drive means 16 for causing the desired movement of housing 14. In one preferred form of the invention, housing 14 comprises a cylindrical enclosure having opposite generally parallel end walls 18, 20 joined by cylindrical surface 22. However, it will be appreciated that housing 14 need not be cylindrical but can assume any configuration consistent with the herein described objectives of the invention. Moreover, the housing may be of any suitable dimensions to accommodate the seed to be treated. An access opening 24 is formed in the cylindrical surface 22 to permit access to the inside of housing 14. Seeds to be exposed to the magnetic field may be placed into and removed from the housing through opening 24. Removably closing access opening 24 is cover 26 which includes a handle 28 thereon for ease of removing from and replacing over opening 24. The cover may be held in place over access opening 24 by any conventional means.

End walls 18 and 20 include a centrally disposed aperture 29, 30 therein for receiving shaft 32 therethrough. The shaft passes longitudinally through cylindrical housing 14 and is fixedly mounted to the end walls such that rotation of the shaft rotates housing 14 (the axis of which is preferably coaxial with the shaft). One end 34 of shaft 32 includes a pulley wheel 36 on which drive belt 38 is mounted. Belt 38 is driven in the conventional manner through motor assembly 40 which includes motor 42, motor shaft 44 and motor pulley wheel 46. Shaft 32, pulley wheel 36 and motor assembly 40 comprise drive means 16. It will be appreciated that the invention is not limited to the drive means illustrated and may include any suitable drive means for imparting motion to housing 14 such that the seeds therein roll and tumble in the magnetic field, preferably for rotating housing 14 about its axis.

Drive means 16 rotates housing 14 about shaft 32 in either direction to expose the seeds within housing 14 to the unipolar magnetic field created by magnet 12, which magnet preferably extends axially along one side of housing 14. Magnet 12 may be mounted in any manner that will permit the energies of a single pole thereof to be applied to the seed contents of housing 14. As shown, the magnetic field of magnet 12 penetrates the cylindrical surface 22 of housing 14. Alternatively, magnet 12 can be disposed adjacent either or both end walls 18, 20 directing its energy through the end walls of the housing. In still other configurations magnet 12 may be attached to the inner or outer surfaces of housing 14, the only limitation being that the magnet must be so oriented that the contents of housing 14 are exposed to the energies of only one of the magnetic poles. For convenience, in a preferred form of the invention magnet 12 is a substantially flat magnetic material, generally rectangular in configuration, wherein one side 12a thereof constitutes the south pole of the magnet and the opposite side 12b thereof constitutes the north pole of the magnet. An elongated magnet support enclosure 48 having one open end is disposed adjacent one elongated side of the cylindrical surface 22. The flat magnet 12 is slidably received within enclosure 48 with one of its polar sides 12a or 12b directed toward housing 14 to expose the contents of the housing to the energies of that pole. For convenience, magnet 12 may include a knob or handle 13 projecting from one end thereof to provide a gripping portion for sliding the magnet into and out of enclosure 48. If it is desired to change the magnetic pole to which the housing contents are exposed, it is a simple matter to grasp knob 13, slide magnet 12 out of the open end of enclosure 48, flip the magnet over to direct the other pole toward the housing and then reinsert the magnet into the enclosure 48 through the open end thereof. Of course, if magnet 12 is an electromagnet, then the polarity of the magnet can be changed electrically, e.g., by reversing the current flow.

To utilize apparatus 10 for exposing seeds to one of the poles of magnet 12, cover 26 is removed from opening 24, the seeds to be treated are placed within the enclosure, and cover 26 is replaced over the opening. The desired magnetic pole is selected and magnet 12 is oriented so that the proper pole faces the seed housing, after which magnet 12 is placed into the magnet enclosure 48. Motor 42 is actuated and, via motor shaft 42, pulley wheels 46 and 36 and drive belt 38, shaft 32 is rotated, thus rotating the housing 14 thereabout. As the housing rotates, the seeds therein are moved through the magnetic field directed toward housing 14 by magnet 12. The seeds tumble and rotate end over end and side over side through and in the magnetic field such that all portions of the seeds are exposed to the field. The motion of one seed against another or against the inner surfaces of the enclosure, which may optionally be lined with a soft, rubberized material to prevent physical damage to the seeds, has a frictional effect which causes the generation of heat with the result that both the seeds and the air in the housing tend to become warm. This warmth is believed to expand the seeds to a certain extent and to make them more receptive to the influence of the applied magnetic field. Rotation of housing 14 is continued for the desired exposure time interval after which the motor is shut off and rotation ceases. If the magnet used is an electromagnet, through appropriate electrical connection of the current flow control to the magnet and to the motor, a single switch could simultaneously shut both off.

It is important that the parts of the rotating housing, the shafts, pulleys, drive means, magnet enclosure, etc. have very low magnetic retentivity in order that the seeds can remain in the housing without further exposure to a magnetic field after the desired exposure time has expired. Thus, construction materials such as plastic, aluminum, brass or like materials which will not retain magnetism are preferred for use. If a magnet other than an electromagnet is used, it is desirable to either remove it from enclosure 48 upon cessation of rotation or otherwise prevent its magnetic energies from further influencing the seeds. This latter objective can be achieved by interposing a magnetic field impermeable shield (not shown) between magnet 12 and housing 14 to prevent the magnetic field from reaching the seeds. Alternatively, of course, the seeds can be promptly removed from the housing.

Figure 2:
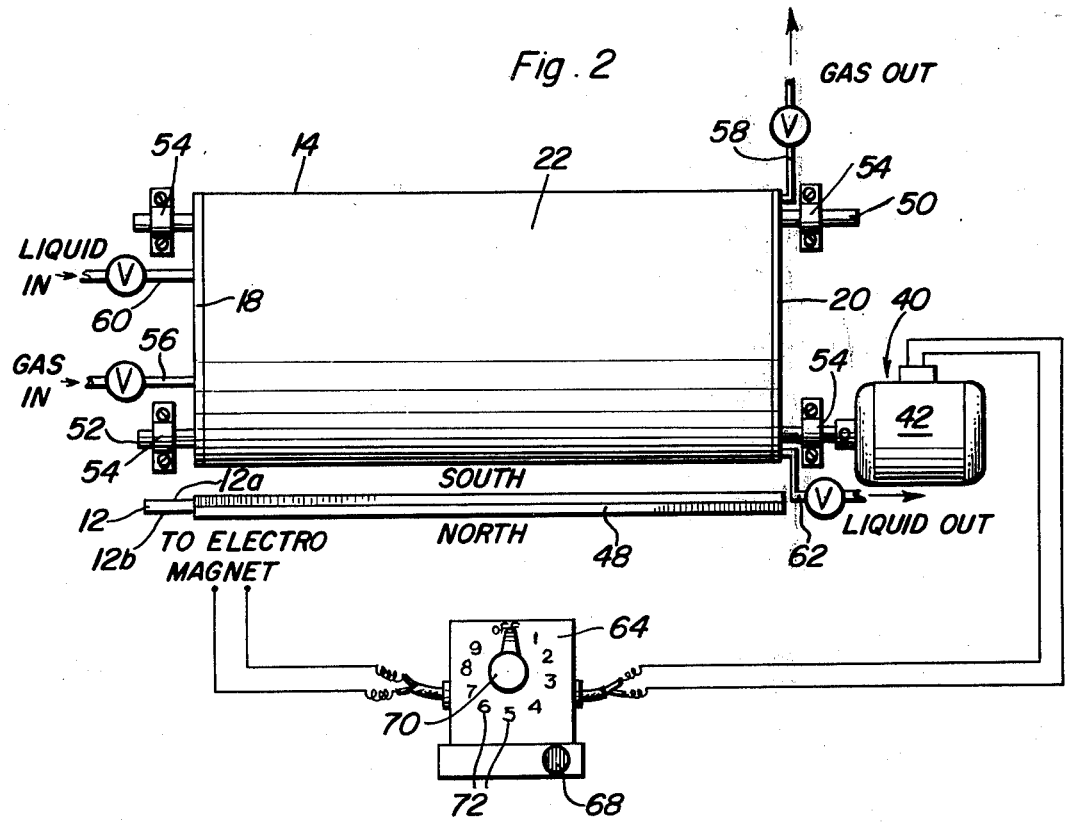
FIG. 2 is an elevational view of another embodiment of the apparatus of the present invention schematically showing liquid and gas ports communicating with the interior of the housing and timer means operatively associated with the drive means.

Another embodiment of the invention is illustrated in FIG. 2 wherein rotation of housing 14 is achieved by a second form of drive means. Housing 14 is supported on two longitudinally extending shafts 50 and 52 with the outer cylindrical surface 22 of the housing frictionally engaging the shafts. Shaft 50 is journaled for free rotation in support means 54 at opposite ends thereof. Shaft 52 is also journaled for rotation in support means 54. However, shaft 52 is driven by motor assembly 40, which may include motor 42 directly coupled to shaft 52 as shown in FIG. 2. Alternatively, the motor assembly may also include motor pulley wheel 46 acting through a drive belt 38 and a shaft pulley wheel 36 mounted on shaft 52 (as shown in FIG. 1). The rotation of shaft 52 caused by motor assembly 40 is transmitted to and causes frictionally engaged cylindrical housing 14 to also rotate. The rotation of housing 14, which is supported on and frictionally engages shaft 50, causes shaft 50 to rotate also. In this manner, the seeds may be rotated and tumbled and exposed to the unipolar magnetic field created by magnet 12 in much the same manner as with the apparatus of FIG. 1.

During exposure to the unipolar magnetic field the seeds may be treated with or exposed to gaseous or liquid media, such as air, water, liquid fertilizers, and the like. In order that gaseous media can reach the seeds, valve controlled inlet gas port 56 and outlet gas port 58 communicate with the interior of the housing through end walls 18 and 20, respectively. These gas ports are particularly useful for venting the warm air and/or introducing cool air into the housing. Likewise, valve controlled liquid inlet line 60 and discharge liquid line 62 communicated with the interior of the housing through end walls 18 and 20, respectively. Through lines 60 and 62, liquids such as water, liquid fertilizer, and the like can be intimately admixed with the seeds and simultaneously exposed to the unipolar magnetic field. It is believed that exposure of water and other liquids to the same unipolar magnetic field as influences the seeds alters the water sufficiently to beneficially improve its characteristics as a germination initiator.

While the length of exposure time and the strength of the magnetic field to which the seeds or other housing contents are exposed will vary among seed varieties and types and are dependent to a large extent upon the desired characteristics sought in the plants resulting from the exposed seeds, the magnetic field strength is desirably maintained at the seeds in the range 600 to 3500 gauss. Most desirably, magnetic field strength at the seeds should be in the range 600 to 800 gauss. Optimum seed exposure time also varies considerably with seed varieties and types and with other exposure conditions. Nevertheless, it can fairly be stated that seed exposure times should be controlled generally to from 5 seconds to 14 hours, and more usually from 5 seconds to 60 minutes. The extended exposure periods approaching 14 hours are useful only for a few seed types, e.g., tobacco. Too little exposure, of course, will not develop the desired characteristics in the seed. On the other hand, too great an exposure time can adversely affect the characteristics of the exposed seeds. Indeed, it has been found that there is an optimum exposure time for each variety of seed and the usefulness of the apparatus can be enhanced by operating motor 42 via a timer 64 which includes an indicator lamp 68 which lights when the apparatus is operating. The face of timer 64 may include a pointer dial 70 and a plurality of indicia 72 arranged thereabout whereby each indicia represents by number keyed to a chart or by seed name, the appropriate timer setting for each seed type. Where numbers are used as indicia, a typical chart would associate each number with one or more seed types. Thus, for illustrative purposes only, to process corn, dial 70 could be moved to position -10-; cotton and/or watermelon seeds might best be treated at position -8-; and the like. Preferably, the dial 70 is spring-biased to the off position and is clockwise rotatable to point to one of the indicia 72 which indicate a predetermined time exposure for the seeds to be treated. When the dial 70 is other than in the OFF position, the electrical circuitry is closed and current flows to the motor which drives housing 14. The timer dial 70 rotates counter-clockwise until it reaches the OFF position at which point the electrical circuitry to the motor 42 (and to the magnet 12, if it is an electromagnet) is automatically opened. If desired, in addition to lamp 68, other signals may be used to indicate the end of seed exposure time, such as bells, buzzers, and the like.

As a general matter, as will be more clearly indicated in the following examples, south pole exposure of seeds produces plants having lower acidity, thicker but shallower root structures, larger leaves, greater sugar content, faster germination rate and increased protein content compared to north pole exposed seeds. North pole exposure of seeds produces plants having greater yield, taller plants and longer and deeper roots than south pole exposed plants. As a result, south pole exposed seeds produce plants having generally better individual characteristics in terms of nutritional values and north pole exposed seeds produce plants having larger size and greater yields. However, the foregoing conclusions are merely generalizations, and the particular pole to which a particular seed should be exposed varies on a seed type by seed type basis. Aside from these general trends, there is little consistency in results attained between different seed types under similar exposure conditions although for each seed type the results appear to be consistently reproducible. Thus it cannot be stated categorically that north pole exposure is better or worse than south pole exposure—it depends upon the seed type and the desired results. For example, although south pole exposure may produce a plant having higher protein and sugars content than north pole exposure under ideal growth conditions, since the south pole root structure is shallow, such a plant would do poorly in arid areas. Therefore, it might be desirable to use north pole exposure to obtain deeper root penetration notwithstanding that the protein and sugars content in the resulting plant might not be as good under ideal conditions. Under the arid conditions, north pole protein and sugars content may turn out to be better because the plant will be healthier.

The following examples illustrate how seed exposure in the apparatus of the present invention to north and south pole magnetic fields influences the chemical and physical characteristics of the plants grown therefrom.

EXAMPLE I

Commercial dry corn and food table corn seeds were divided into three groups. The first group was exposed by rotating and tumbling in a magnetic field created by a magnetic north pole for a fixed time period. The second group was similarly exposed for the same time period to the magnetic field created by a magnetic south pole. The third group was rotated and tumbled in the apparatus, but without any magnetic field, for the same time period. The magnetic field strengths for both north and south poles were 600 gauss at the seeds. The treatment time for all groups was 15 minutes. A large number of separate plantings were made for seeds from each group under identical soil and ambient conditions. The seeds developed into plants and the plants were all harvested at the same time. The following Table I tabulates the averaged results for all plantings for each group for the indicated plant characteristic measured by conventional techniques.

TABLE I

| Corn Plant Characteristic | Untreated Control | South Pole Exposed | North Pole Exposed |
|---|---|---|---|
| Germination time | 7 days | 4–5 days | 6 days |
| Yield (% of control) | 100% | 114% | 124–131% |
| Cob | | | |
| Dextrose | 2% | 5% | 3% |
| Glucose | 2% | 4% | 3% |
| Natural sugars | 1% | 3% | 2% |
| Protein | 5% | 7% | 3% |
| pH | 7 | 6.9 | 6.5 |
| Kernels | | | |
| Dextrose | 2% | 5% | 3% |
| Glucose | 1% | 5% | 2% |
| Natural sugars | 3% | 10% | 5% |
| Protein | 3% | 10% | 5% |
| pH | 6.3 | 6.5 | 6.2 |

The foregoing data are noteworthy for a number of reasons. First, it appears that both north and south pole exposed seeds produced plants having improved quantities of sugars and proteins, although south pole exposed seeds produced plants which were superior in these characteristics. Second, south pole exposed seeds appeared to germinate more rapidly than north pole exposed seeds which, it turn, germinated more rapidly than the controls. Third, north pole exposed seeds produced the greatest yields, followed by south pole exposed seeds and then by the controls. In each case, yield was calculated in ears/acre. Finally, both north and south pole magnetic field exposure seemed to increase acidity in the cob compared to the control. However, in the kernels, south pole exposure decreased acidity although north pole exposure increased acidity.

EXAMPLE II

As in Example I, corn seeds in three groups were exposed to 600 gauss north and south pole fields and to no magnetic field whatever while being rotated and tumbled in the apparatus of the present invention for 15 minutes. The purpose of this example was to demonstrate the effects of exposure on various corn seed varieties.

Nine separate corn seed varieties were exposed to a south pole field and to no field at all and then a number of separate plantings of each seed variety were made. Measurements of stalk lengths in inches were made 30 days after planting. The results for each variety are set forth in Table II.

TABLE II

| Variety | Stalk Length Control | South Pole Exposed |
|---|---|---|
| 1. Standard Yellow Table | 9.5 | 11.4 |
| 2. Standard White Field | 8.75 | 10.6 |
| 3. Bantam Standard | 7.77 | 9.9 |
| 4. Bantam White Standard | 8.2 | 10.8 |
| 5. Bantam Hybrid Yellow | 6.4 | 9.9 |
| 6. Bantam Hybrid White | 9.9 | 11.9 |
| 7. Bantam Late Season | 10.5 | 14.6 |
| 8. Standard Early Yellow | 9.6 | 12.7 |
| 9. Standard Early Field | 11.7 | 15.6 |

It is apparent that south pole exposure resulted in increased stalk length 30 days after planting. North pole exposure resulted in still greater growth increases relative to the controls, averaging about 35% increased growth as compared with the Table II data which averaged about 31% increased growth.

The stalks were analyzed for protein content. It was found that the protein averaged 14.7% in the controls while south pole exposed seeds yielded plants averaging 22.7% as shown in Table III where the corn varieties are identified by their corresponding numbers from Table II.

TABLE III

| Varieties | Protein Content Controls | South Pole Exposed |
|---|---|---|
| 1 | 17.6% | 31.1% |
| 2 | 14.5% | 29.1% |
| 3 | 16.4% | 26.9% |
| 4 | 12.5% | 19.9% |
| 5 | 18.3% | 21.6% |
| 6 | 12.4% | 18.7% |
| 7 | 14.3% | 18.5% |
| 8 | 11.5% | 17.7% |
| 9 | 14.6% | 21.1% |

Protein measurements on the whole cob with the kernels intact showed that protein in the controls averaged 27% whereas south pole exposed seeds yielded plants averaging 36.4% protein.

Stalk diameter measurements were also made at harvesting on each of the varieties. The results appear in Table IV.

TABLE IV

| Varieties | Stalk Diameter Controls | South Pole Exposed |
|---|---|---|
| 1, 2, 7 | ¼ inch | ½ inch |
| 3, 4, 5, 6 | ⅜ inch | ¾ inch |

TABLE IV-continued

| Varieties | Stalk Diameter Controls | South Pole Exposed |
|---|---|---|
| 8, 9 | ½ inch | ⅞ inch |

Similar studies made on plants grown from magnetic field exposed soy beans, beans, sugar beets, peas, melons, cucumbers, oats, wheat, rye, barley and twelve other vegetable and grain plants yielded results indicating about 12 to 30% increases in plant growth and characteristics in the plants grown from north or south pole exposed seeds compared with the controls.

EXAMPLE III

Seeds from radish plants were exposed in the apparatus of the present invention to north and south pole magnetic fields of about 1200 gauss for varying time intervals. The seeds were planted in substantially identical adjacent plots and subjected to substantially identical environmental conditions. After 30 days the length of the plant leaves were measured to determine the optimum exposure time for radishes.

TABLE V

| | Leaf Length | |
|---|---|---|
| Exposure Time | North Pole Length (inches) | South Pole Length (inches) |
| 0 (control) | 2¼ | 2¼ |
| 5 minutes | 3¼ | 2¼ |
| 10 minutes | 2½ | 2¼ |
| 15 minutes | 2½ | 2¾ |
| 25 minutes | 2½ | 3 |
| 45 minutes | 2½ | 3¼ |
| 60 minutes | 3 | 2¾ |

It is interesting that the optimum exposure time period for north pole exposure of radish seeds as determined from 30 day leaf length is 5 minutes or 60 minutes. For south pole exposed seeds, the optimum exposure time appears to be 45 minutes or 25 minutes.

EXAMPLE IV

The procedure of Example III was practiced on a variety of corn seeds using only the north pole field at 1200 gauss. The stalk height was measured after 30 days. The results are set forth below:

TABLE VI

| | Stalk Height |
|---|---|
| Exposure Time | North Pole Stalk Height (in.) |
| 0 (control) | 13 |
| 5 | 18 |
| 10 | 15 |
| 15 | 17½ |
| 25 | 15½ |
| 45 | 13 |
| 60 | 12½ |

The optimum exposure time for this variety corn seed based upon maximizing stalk height appears to be either 5 minutes or 15 minutes.

EXAMPLE V

The procedure of Example III was practiced on another variety of corn seeds using only the south pole field at 600 gauss. The stalk height measurements after 21 days appear below:

TABLE VII

| | Stalk Height |
|---|---|
| Exposure Time | South Pole Stalk Height (in.) |
| 0 (control) | 9¾ |
| 5 minutes | 12¼ |
| 10 minutes | 9 |
| 15 minutes | 14 |
| 30 minutes | 12¾ |
| 45 minutes | 11¼ |
| 60 minutes | 11 |

The optimum time for south pole exposure of this variety corn seed based upon maximizing stalk height appears to be 15 minutes.

EXAMPLE VI

The procedure of Example III was practiced on English pea seeds by exposing the seeds to 1200 gauss of a north pole field. Thirty days after planting, plant height was measured and appears below:

TABLE VIII

| | Plant Height |
|---|---|
| Exposure Time | North Pole Plant Height (in.) |
| 0 (control) | 3½ |
| 5 minutes | 3¼ |
| 10 minutes | 5½ |
| 15 minutes | 2¼ |
| 25 minutes | 4 |
| 45 minutes | 5½ |
| 60 minutes | 3¼ |

Optimum north pole exposure time for maximizing plant height of this seed variety appears to be 10 or 45 minutes.

EXAMPLE VII

The procedure of Example III was practiced on English pea seeds by exposing the seeds to 1200 gauss of a south pole field. Thirty days after planting, plant height was measured and appears below:

TABLE IX

| | Plant Height |
|---|---|
| Exposure Time | South Pole Plant Height (in.) |
| 0 (control) | 4 |
| 10 minutes | 5½ |
| 15 minutes | 3¾ |
| 25 minutes | 4¾ |
| 40 minutes | 4 |
| 60 minutes | 4¼ |

The optimum time of south pole exposure for this variety pea seed based upon maximizing plant height appears to be 10 minutes.

EXAMPLE VIII

The procedure of Example III was practiced on a variety of string bean seeds using only the south pole field at 600 gauss. Plant height measurements were made 19 days after planting with the following results:

TABLE X

| | Plant Height |
|---|---|
| Exposure Time | South Pole Plant Height (in.) |
| 0 (control) | 5 |

TABLE X-continued

| Exposure Time | Plant Height<br>South Pole<br>Plant Height (in.) |
|---|---|
| 5 minutes | 4¼ |
| 10 minutes | 4½ |
| 15 minutes | 7 |
| 30 minutes | 6 |
| 45 minutes | 3½ |
| 60 minutes | 6 |

The optimum south pole exposure time to maximize plant height for these string bean seeds appears to be 15 minutes.

EXAMPLE IX

The procedure of Example VIII was practiced on cantaloupe, watermelon and tomato seeds using only the south pole energies at 600 gauss. Plant height measurements were made 19 days after planting. Tabulated below are the optimum south pole exposure times for each type seed to maximize plant height:

| Watermelon | 5 minutes |
|---|---|
| Cantaloupe | 10 minutes |
| Tomato | 10 minutes |

The foregoing examples indicate that rotating and tumbling plant seeds in the apparatus of the present invention while exposing them to the magnetic field energies of only one magnetic pole improves many of the characteristics of the resulting plant. No supportable explanation for the differing effects of the respective poles and the varying exposure times appears available. However, it is believed that each pole affects each element and organic bond in the plant structure in a different manner and because, by their nature, each seed and plant variety have differing elemental compositions and structures, the magnetic pole exposure effect differs for each plant. However, the common thread in the experimental results appears to be that exposure to a unipolar magnetic field generally improves plant characteristics over similarly treated but unexposed controls and that the exercise of control over exposure time is critical. Moreover, it has been found that unipolar magnetic field exposure in a distinct improvement over bipolar magnetic field exposure.

While the present invention has been described with respect to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. Apparatus for magnetically treating seeds comprising:
   a. a magnet for producing a unipolar magnetic field;
   b. a housing spaced from said magnet and within said field, said housing including a closable access opening therein for receiving said seeds and for retaining them within said unipolar magnetic field;
   c. drive means operatively associated with said housing for imparting only rotary motion to said housing for causing said seeds to roll and tumble within said housing, said rolling and tumbling comprising the only movement of said seeds relative to said unipolar magnetic field.

2. Apparatus, as claimed in claim 1, wherein said unipolar magnetic field is a north pole field.

3. Apparatus, as claimed in claim 1, wherein said unipolar magnetic field is a south pole field.

4. Apparatus, as claimed in claim 1, further including means for controlling the exposure time of said seeds to said magnetic field.

5. Apparatus, as claimed in claim 1, wherein said housing is enclosed, includes closable openings in said housing for flowing fluid media into and out of said housing.

6. Apparatus, as claimed in claim 5, wherein said means for controlling exposure time is a timer adapted to be set for predetermined periods of time, said timer is operatively associated with said drive means to terminate housing motion when said predetermined time has expired, said timer having a plurality of timer settings and including indicia associated with at least some of said settings to associate said settings with seed varieties treated in said housing.

7. Apparatus, as claimed in claim 6, wherein said magnet is an electromagnet and said timer is operatively associated therewith to terminate the flow of current to said magnet when said predetermined time has expired.

8. Apparatus, as claimed in claim 1, wherein said housing is an elongated enclosed cylinder having a longitudinally extending axis and said drive means rotates said cylinder about its longitudinal axis.

9. Apparatus, as claimed in claim 8, wherein said magnet is generally elongated and disposed outside said housing and generally parallel to said axis.

10. Apparatus, as claimed in claim 8, wherein said magnet is substantially flat having a length at least as long as said cylinder, one side of said magnet constituting the north pole thereof and the other side of said magnet constituting the south pole thereof.

11. Apparatus, as claimed in claim 10, wherein said magnet is disposed adjacent said cylindrical surface with one flat side thereof facing said cylindrical surface and the other flat side thereof facing away from said cylindrical surface, whereby the magnetic energy field of the magnetic pole constituting said side facing said cylindrical surface is directed toward said housing.

12. A method of magnetically treating seeds to alter the characteristics of plants grown therefrom comprising:
   a. causing relative motion between said seeds and a unipolar magnetic field, said motion consisting only of rolling and tumbling said seeds for a predetermined period of time of from 5 seconds to 14 hours in said unipolar magnetic field to expose all portions of said seeds to said field, said field having a strength of from 600 to 3500 gauss at said seeds; and
   b. restraining said seeds against movement out of said field.

13. A method, as claimed in claim 12, wherein said unipolar magnetic field is a north pole field.

14. A method, as claimed in claim 12, wherein said unipolar magnetic field is a south pole field.

15. A method, as claimed in claim 12, wherein said magnetic field strength is 600 – 800 gauss.

16. A method, as claimed in claim 12, wherein said exposure time is from 5 seconds to 1 hour.

17. A method, as claimed in claim 12, wherein said seeds are in contact with a liquid while tumbling in said magnetic field.

18. A method, as claimed in claim 17, wherein said liquid is water.

* * * * *